(12) United States Patent
Deshpande et al.

(10) Patent No.: US 8,786,782 B2
(45) Date of Patent: Jul. 22, 2014

(54) MULTIPLE-INPUT CONFIGURATION AND PLAYBACK VIDEO ENHANCEMENT

(75) Inventors: Nikhil Deshpande, Pennington, NJ (US); Ximin Gong, Belle Mead, NJ (US); Peter A. von Kaenel, Princeton, NJ (US); James W. Appleby, II, Fallsington, PA (US); Randy W. Sills, Sr., Levittown, PA (US)

(73) Assignee: Disney Enterprises, Inc., Burbank, CA (US)

( * ) Notice: Subject to any disclaimer, the term of this patent is extended or adjusted under 35 U.S.C. 154(b) by 313 days.

(21) Appl. No.: 13/222,390

(22) Filed: Aug. 31, 2011

(65) Prior Publication Data

US 2013/0050581 A1    Feb. 28, 2013

(51) Int. Cl.
*H04N 5/262* (2006.01)
*H04N 5/268* (2006.01)
*H04N 5/272* (2006.01)

(52) U.S. Cl.
CPC .............. *H04N 5/262* (2013.01); *H04N 5/268* (2013.01); *H04N 5/272* (2013.01); *H04N 5/2723* (2013.01)

USPC ........... 348/584; 348/589; 348/705; 348/578; 348/596; 348/600

(58) Field of Classification Search
USPC ......... 348/584, 578, 589, 591, 600, 598, 705, 348/722; 386/216, 223
See application file for complete search history.

(56) References Cited

U.S. PATENT DOCUMENTS 8,538,233 B2 *    9/2013    Gong .............................. 386/223

* cited by examiner

*Primary Examiner* — Jefferey Harold
*Assistant Examiner* — Jean W Desir
(74) *Attorney, Agent, or Firm* — Fay Kaplun & Marcin, LLP

(57) ABSTRACT

A system and method for delaying a first version of a video feed from a video camera according to a first delay to generate a second version of the feed, supplying the first version to an insertion system, wherein the insertion system inserts an indicia into the first version to create an enhanced version with a second delay substantially matching the first delay and supplying the enhanced version and the second version to a production switcher, wherein the enhanced version and the second version supplied to the production switcher are synchronized with one another.

15 Claims, 6 Drawing Sheets

MULTIPLE-INPUT CONFIGURATION AND PLAYBACK VIDEO ENHANCEMENT

FIELD OF THE INVENTION

The exemplary embodiments relate to a system that inserts indicia into live or pre-recorded video signals, particularly, to a system that produces a "clean version" of the video signal having no indicia insertion and an "enhanced" version of the video signal that includes the inserted indicia.

BACKGROUND INFORMATION

A sporting event typically is recorded by a plurality of cameras placed at locations around the venue, with each camera location providing a different view of the sporting event. For example, in a baseball game, one camera, placed beyond the outfield fence, records the batter from the perspective of the pitcher; another one, placed in or near the dugout, records the batter from the side. A director, who may be located in a production truck outside the stadium or remotely at a production studio, is responsible for creating a broadcast program from all the camera feeds. Using a standard production switcher, the director creates a broadcast program consisting of a sequence of scene cuts switching from one camera feed to another. In the case of baseball, for example, the director may initially select to broadcast the feed from the dugout camera at the beginning of an at-bat to show the batter in perspective; once the pitcher is about to deliver a pitch, the director then cuts the program from the feed of the dugout camera to that of the outfield camera, which can zoom in on the pitcher throwing the ball to the catcher and the batter swinging (or not) at the pitch. In reality, a sporting event involves many more than two cameras, since a broadcast of such an event requires it to be recorded from many different views, with each view being recorded by its own respective camera. Typically, the feeds of all these cameras are supplied to a production switch, where the director dictates the sequence of camera feed cuts to constitute the program for broadcast.

A more recent development in the field of producing video programs for broadcast involves the insertion of indicia or logos (graphics) into the video signals generated by the cameras. Electronic devices for inserting graphics into live video signals, such as described in U.S. Pat. No. 5,264,933 by Rosser, et. al., U.S. Pat. No. 5,488,675 by Hanna, U.S. Pat. No. 5,491,517 by Kreitman et. al., U.S. Pat. No. 5,953,076 to Astle et al., and U.S. Pat. No. 5,808,695 to Rosser et al., all of which are hereby incorporated by reference, have been developed and used for the purpose of inserting advertising and other indicia into broadcast events, primarily sports events. These devices are capable of seamlessly and realistically incorporating logos or other indicia into the original video in real-time, even as the original scene is zoomed, panned or otherwise altered in size and perspective. An indicia insertion system unit typically performs the main functions of recognition using a recognition unit, tracking using a tracking unit, occlusion mask production using an occlusion mask production unit, and rendering using a render unit where the indicia are inserted into the video frame based on the occlusion mask.

The insertion of such logos or other indicia is intended to enhance the viewing experience of end viewers. For instance, in football, a first down line ("FDL") is inserted into the real-time broadcast of a game to signify the point on the field that the team currently on offense must drive towards in order to be awarded four more downs. Other virtual elements are not related to the game itself, but instead comprise advertising indicia inserted at various points on the field of play or on various stadium structures like a stadium wall. Indicia may contain any type of information, including 1) game related statistics, 2) sports, team, or athlete specific data, 3) viewer's related data, or 4) any generic information such as weather, news titles, stocks, etc.

Many ways exist to carry out indicia insertion capabilities in a multi-camera system intended for recording and broadcasting a sporting event. One such way is known as the "brute force" implementation, in which each video camera is provided with its own indicia insertion system. With this approach, all video camera feeds appearing at the input of the production switch will already have had inserted therein any desired indicia. For instance, the camera feed pertaining to the sideline of a football field will arrive at the production switch with a logo or indicia (e.g., an FDL) having already been inserted by the insertion system associated with the sideline camera.

Associating a separate logo insertion capability with each camera of a multi-camera system can introduce many limitations. For instance, the multiple insertion systems occupy a great deal of space in the production truck, which makes the truck much heavier and thus raises its fuel costs and consequently the production costs for the event.

Another problem stems from the fact that in such a system, if a feed has had inserted therein a logo by its associated insertion system, the director at the production switch, when previewing such a feed, must either accept the feed as is or must reject it in favor of a "clean" feed (i.e., a feed without any insertion of indicia) or a feed from a different camera. Typically, when previewing the feeds before selecting one for cutting into the broadcast program, the director cannot readily compare the feed with the inserted logo against the clean feed, either because a clean version is not available or if available it is not in synchronization with the enhanced version. This is especially a problem when the indicia appear to the director to lack that seamlessness and realism that are necessary to create the illusion that the indicia actually is part of the scene being recorded.

Still another problem in multi-camera systems used to film sporting events is the inability to include indicia insertions in highlight clips, also referred to as playback clips. This inability is due to several complications: 1) the playback clip is typically a zoomed-in shot that does not contain enough features to allow recognition and tracking by the insertion system, and 2) the highlight clip is often slowed down to allow the viewers to follow the play, which may cause the tracking function of the insertion system to fail.

DETAILED DESCRIPTION

Figure 1:
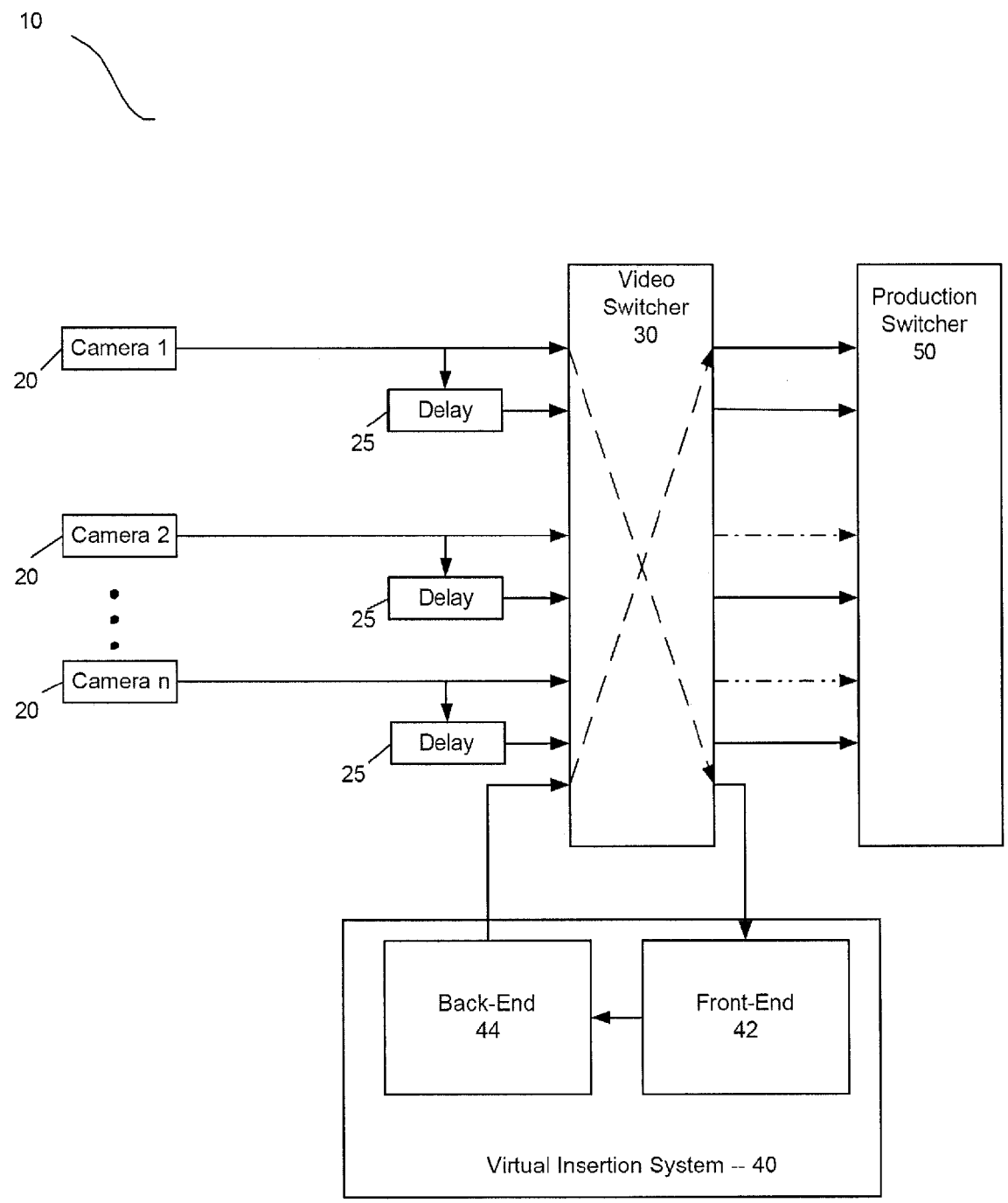
FIG. 1 shows an exemplary multi-camera production system that shares an insertion system among all the cameras according to an exemplary embodiment.

The exemplary embodiments may be further understood with reference to the following description of the exemplary embodiments and the related appended drawings, wherein like elements are provided with the same reference numerals. The exemplary embodiments are related to systems and methods for inserting indicia into live or pre-recorded video signals, particularly, to a system that produces a "clean version" of the video signal having no indicia insertion and a "enhanced" version of the video signal that includes the inserted indicia. In one exemplary embodiment, each of the signals (versions) may be synchronized at the broadcasting switcher input as will be described in greater detail below.

In the above description, it was noted that there are many examples of systems and methods for the insertion of indicia into video sequences and the above provided several examples of such systems and methods. However, it is noted that the exemplary embodiments are not limited to such systems and methods. That is, as will be described in more detail below, the exemplary systems and methods may be applied to any type of insertion system. It is also noted that in the above description and the following description, the exemplary event sites are described as sporting events sites. However, the exemplary embodiments are not limited to such remote event sites. It may be that the exemplary embodiments are implemented for a studio show.

FIG. 1 shows a multi-camera production system 10 that shares an insertion system 40 among all the cameras 20. The output of each camera 20 is supplied to a video switcher 30 directly and indirectly via a standard delay element 25, so that the video switcher 30 receives from each camera the real-time feed and a delayed version of that feed. Those skilled in the art will understand that the standard delay element 25 may be any hardware and/or software component that may be used to delay a video signal. For example, many different types of integrated circuit video delay elements are commercially available. Similarly, the video switcher 30 may be any commercially available frame synchronized production quality video switcher. It is also noted that while FIG. 1 shows the delay elements 25 and the video switcher 30 as separate components, it may be possible to include the functionality of the delay elements 25 into the video switcher 30. That is, all the functionality described herein for the delay elements 25 may be incorporated into the video switcher 30, e.g., by incorporating delay element ICs into the video switcher 30.

The delay imparted by the delay element 25 matches the time that the insertion system 40 uses to insert indicia into a video signal. That is, the delay should match the time needed by the insertion system 40 to perform the searching, tracking, occlusion, and rendering operations described in the above-referenced patents to insert an indicia into a video signal. The processing delay of the total pipeline including the front-end and back-end processing is a function of many variables that may include, for example, the video format, the type of live event that is being recorded (e.g., football, tennis, hockey, etc.), the method/hardware employed to insert the indicia, etc. For example, a football game having a video format of 1080i (1/30 second frame rate), has a delay of approximately 10 frames, while in a video format of 720p (1/60 second frame rate), the delay is approximately 21 frames. Thus, the delay setting is typically fixed per a certain configuration (e.g., depending on the sport, the video format, etc.) and the delay elements 25 are set accordingly. In addition, while the exemplary embodiments describe the delay as being applied to a video signal, this delay may also be imparted to an audio signal for the feed. That is, if the feed includes a combined video and audio signal, the delay would be imparted to the combined signal. If the feed had separate video and audio signals, the delay may be imparted to the separate video and audio signals. A standard production switcher 50 receives synchronized clean and enhanced video feeds from the video switcher 30. The production switcher 50 then outputs the video signal (cut program) dictated by the signal selections input by the production switcher 50 operator based on instructions received from the director.

During shooting of a sporting event, each real-time camera feed, along with its associated delayed version produced by its associated delay element 25, is supplied to video switcher 30. The video switcher 30 supplies one of the un-delayed camera feeds to the insertion system 40, in accordance with a selection that may originate from the production switcher 50 or may be triggered manually by one of the production team. This selection may be implemented at the video switcher 30 manually or automatically. For instance, if at a particular moment during recording the director wishes to use the feed of camera 1, the director would communicate this selection to the operator of the video switcher 30, which would send the video feed of camera 1 (un-delayed version) to the insertion system 40 either automatically in response to a selection signal from the production switcher 50 or manually in response to a human operator entering the necessary commands. The selected camera may be referred to herein as the active camera. Once the director selects a new camera, the newly selected camera is deemed active, while the other ones remain inactive. Thus, unlike the prior art system, in which insertions were made in all the camera feeds at all times, the exemplary embodiment of FIG. 1 allows the insertion to be performed only on the feed of the currently active camera.

The insertion system 40 includes a front-end system 42 and a back-end system 44. In this exemplary embodiment, the front-end 42 is a software module that carries out mainly scene recognition, scene tracking, and camera model calculations, while the back-end 44 is a software module that performs mainly occlusion mask processing and indicia rendering, for example, in the manner described in the above-referenced patents. The front-end and back-end software may be stored on and executed by a single computer system, or may be stored on and executed by separate connected computer systems. This design allows a flexible and scalable configuration in which any number of inputs may be processed by a front-end component coupled with a video switcher, and any number of outputs may be generated by a back-end-component. This architecture is advantageous also because the front-end component, by its nature, depends on the scene, i.e., it is scene dependent. For example, a football field and a basketball field are represented by different scene models and therefore, the front-end processing is different. In a further example, modeling the field view and the wall view, in the same stadium, is different and therefore, may also have different front-end processing. Thus, the recognition part that resides in the front-end component is typically scene dependent. On the other hand, the back-end component is in general scene independent. In addition, the front-end 42, may rely on receiving the current camera's identification as the source of video feed changes. The current camera's static parameters (e.g. physical location, lens's characteristics) are used to estimate the dynamic camera's parameters (e.g. roll, pan, tilt, and zoom). This camera identification may be manual or automatic.

It is again noted that the description of the indicia insertion method is consistent with the methods described in the above-mentioned patents. However, other indicia insertion methods are known in the art and the exemplary embodiments may be used with these other types of indicia insertion methods. The adaptation of the exemplary embodiments to be used with these other types of indicia insertion methods would be understood by those of skill in the art in conjunction with the functionalities described herein for the exemplary embodiments. For example, the delay introduced by the delay elements 25 would be consistent with the delays introduced by the other types of indicia insertion methods, the allocation of front-end and back-end processing would be consistent with the principles for splitting the functionalities described for the exemplary embodiments, etc.

Once indicia is inserted with the proper perspective, and with any needed occlusion resolved, into the real-time feed of, for example, camera 1, this enhanced feed is supplied to the video switcher 30, which supplies this signal to an input of the production switcher 50. While the real-time feed of camera 1 was being enhanced in the insertion system 40, the delayed version of the feed was supplied to another input of the production switcher 50. Since the delayed version is delayed by an amount of time that matches the processing time of the insertion system 40, when the enhanced feed of camera 1 is supplied to the production switcher 50, it will be synchronized (i.e., no phase difference) at the production switcher 50 input with the delayed version output by the delay element 25. Thus, at the production switcher 50, the director will have the benefit of having two synchronized versions of the same feed, one with an inserted indicia and another without any such insertion. Moreover, the enhanced camera feed will be in synchronization with the clean feeds from the other cameras. The director may then select one of the cameras' feeds to be cut into the broadcast program output from the production switcher 50. For instance, after viewing the enhanced feed, the director may decide that the indicia have not been seamlessly integrated into the video signal, which would cause him to select either the clean version for broadcast or another camera feed. Thus, with this system having all feeds aligned at the production switcher 50 input, the director is given the flexibility to accept a camera feed with or without enhancement.

Although FIG. 1 has been described within the context of a multi-camera system, the concept of providing a director with the option of choosing between an enhanced and non-enhanced version of the same feed is applicable to a system having only a single camera, in which a delayed version of its feed is supplied to the production switcher 50 and the real-time version is supplied to the production switcher 50 only after having first been passed through insertion system 40 for enhancement.

Figure 2:
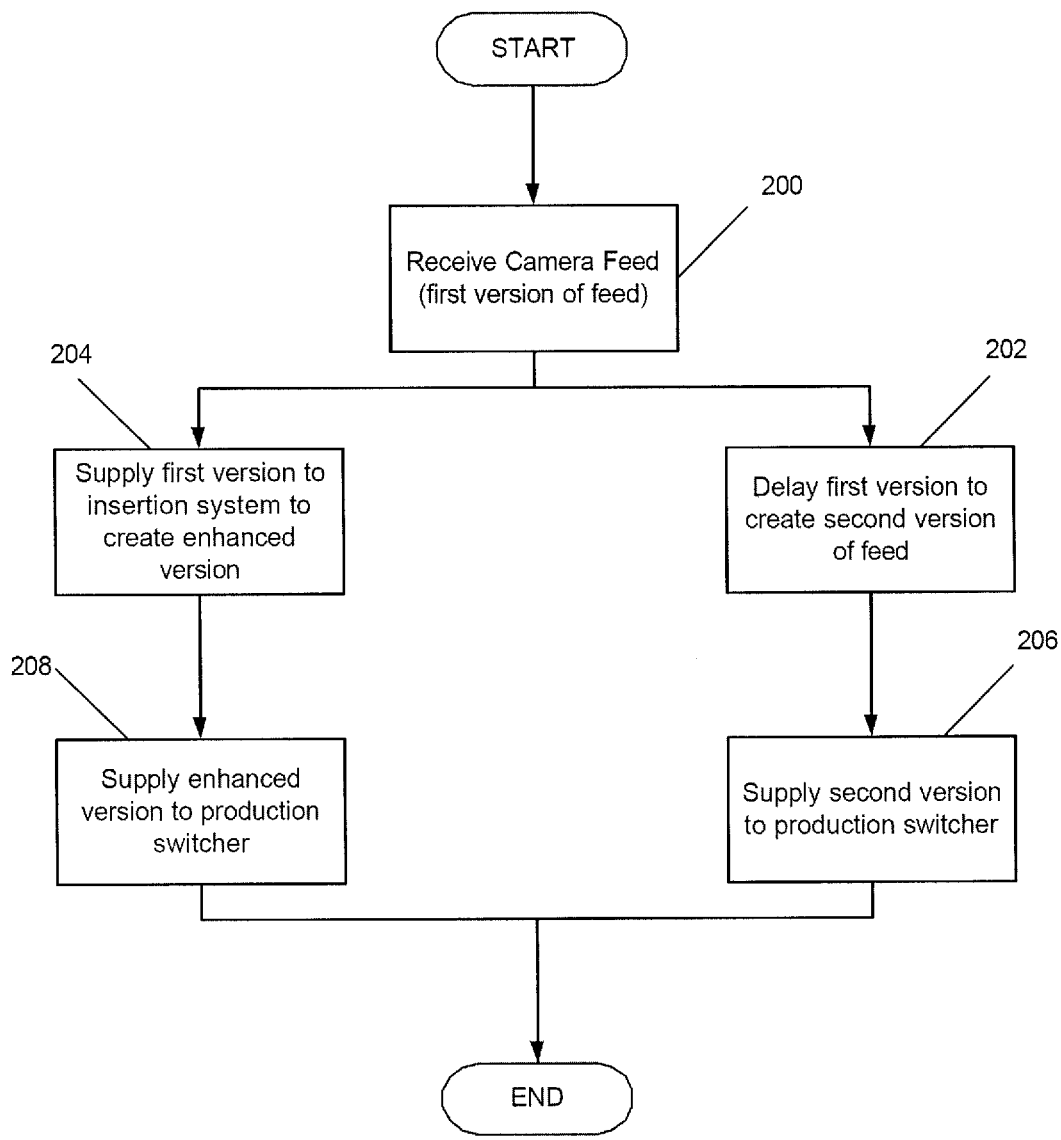
FIG. 2 shows an exemplary flow diagram of the operation of the exemplary system of FIG. 1.

FIG. 2 shows an exemplary flow diagram of the operation of the exemplary system of FIG. 1. The flow diagram of FIG. 2 shows the parallel paths that the camera feeds follow to result in a clean feed (second version) and an enhanced feed (enhanced version) being received at the production switcher 50. In step 200, a camera feed (first version) from one of the cameras 20 is received at the video switcher 30. In step 202, a delayed version of the camera feed (second version) is generated by passing the feed through a delay element 25, and then supplying the delayed version to the video switcher 30. As noted above, the delay amount imparted by the delay element 25 is based on the amount of time the insertion system 40 takes to enhance an input video feed.

At step 204, the undelayed version (first version) of the camera feed is supplied to the insertion system 40, which performs the typical insertion functions of searching and tracking (by front-end 42) and occlusion mask generation and rendering (by back-end 44) in order to output an enhanced version of the camera feed that includes an indicia inserted at a certain location and in a certain perspective in the video image. For instance, the indicia may be a first down line placed at a certain yard line on a football field, or an advertising logo placed at a predetermined location in a baseball outfield, etc.

At step 206 the delayed, non-enhanced version (second version) of the camera feed is supplied by the video switcher 30 to the production switcher 50. Step 208 involves supplying the enhanced version of the camera feed to the production switcher 50. As explained before, the enhanced and non-enhanced versions of the camera feed arrive at the production switcher 50 in synchronicity with one another, in order to permit a director to insert into the broadcast program either the version with the indicia enhancement (enhanced version) or the version without (second version).

Figure 3A:
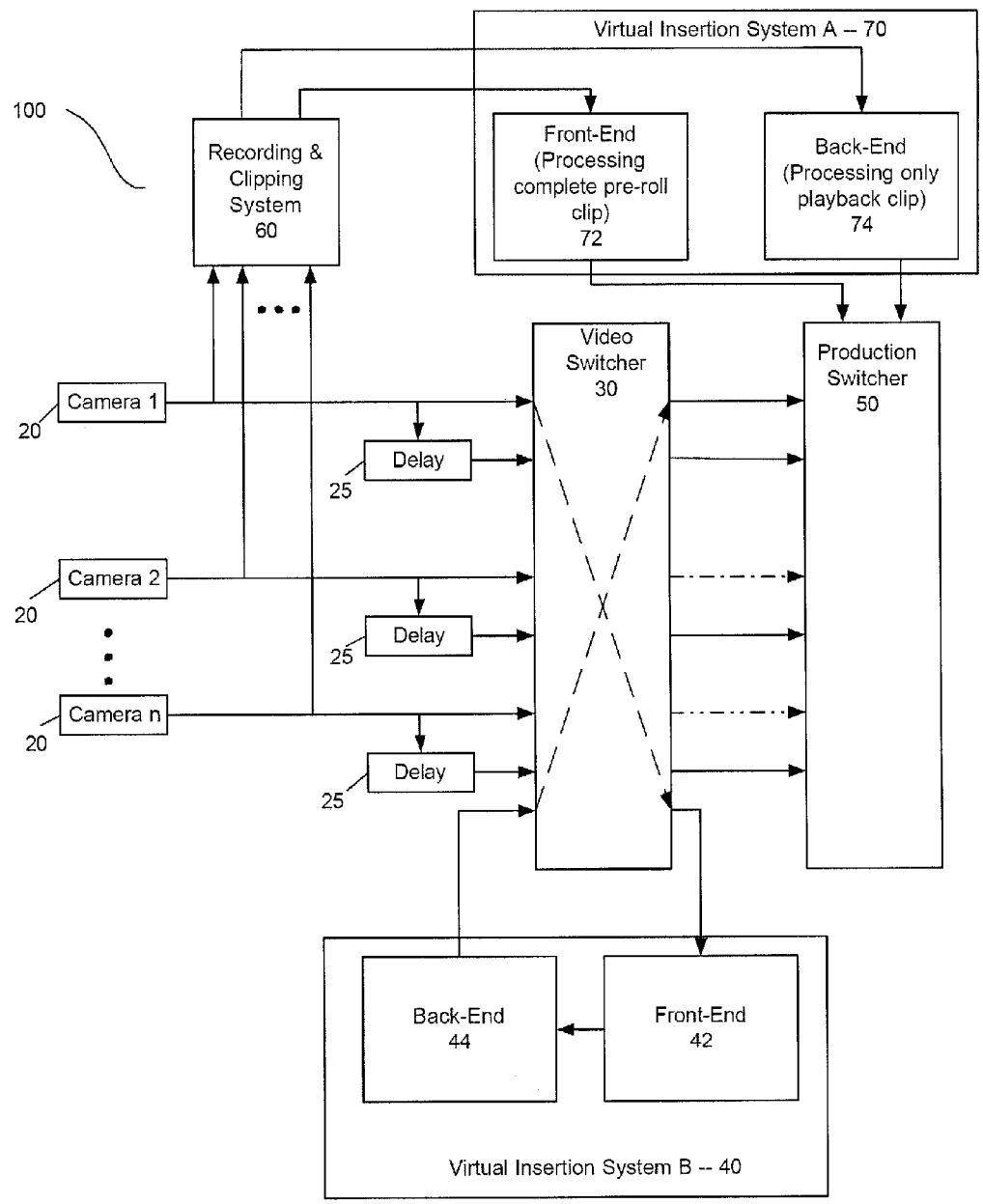
FIG. 3A shows a modified version of the exemplary system of FIG. 1 for inserting indicia in highlight clips according to an exemplary embodiment.

FIG. 3A shows an exemplary modified version of the system of FIG. 1 for inserting indicia in highlight clips (also referred to as playback clips). As noted above, inserting indicia into highlight clips is challenging due to certain complicating factors. For instance, since most playback clips are zoomed in by a large factor, often too few landmarks in the video image are available for the recognition function necessary for a successful estimation of the camera model. Another complication, for instance, is due to the fact that often playback clips are played back at a slowed down rate, which may challenge the robustness of the tracking function.

Figure 3B:
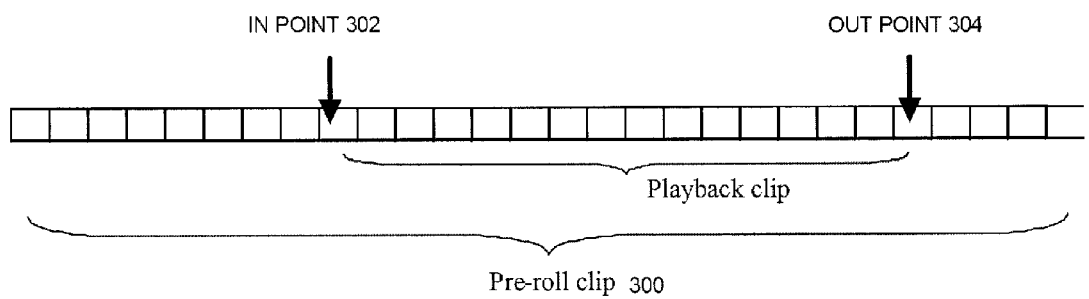
FIG. 3B shows an example of a pre-roll clip according to an exemplary embodiment.

The system of FIG. 3A employs a standard recording and clipping system 60 which is typically operated by a dedicated operator. The system 60 continuously records the feeds of all the cameras 20. As a result of a significant play, a highlight clip may be extracted from any camera, depending on which one, in the judgment of the director, yielded the best view of the significant play on the field. In order to properly queue up a playback clip, a pre-roll clip of a camera feed from a selected camera is taken from the recording and clipping system 60. FIG. 3B shows an example of such a pre-roll clip 300. After reviewing the pre-roll clip 300, the director will decide which portion of the clip contains the significant play. The director will select a starting point within the pre-roll clip, otherwise known as the in-point 302, and select an end-point within the pre-roll clip, otherwise known as the out-point 304. The portion of the pre-roll clip bounded by points 302, 304 corresponds to the highlight or playback clip of the significant play that the director wishes to broadcast.

Referring back to FIG. 3A, the insertion system A (70) is used to insert indicia into a selected playback clip. The insertion system B (40) remains in the system to perform the functions described in connection with FIG. 1. Although FIG. 3A illustrates two separate insertion systems, it is to be understood that both insertion systems can be combined into a single insertion system, while preserving the ability to perform all the insertion functions described in both Figures.

Figure 4:
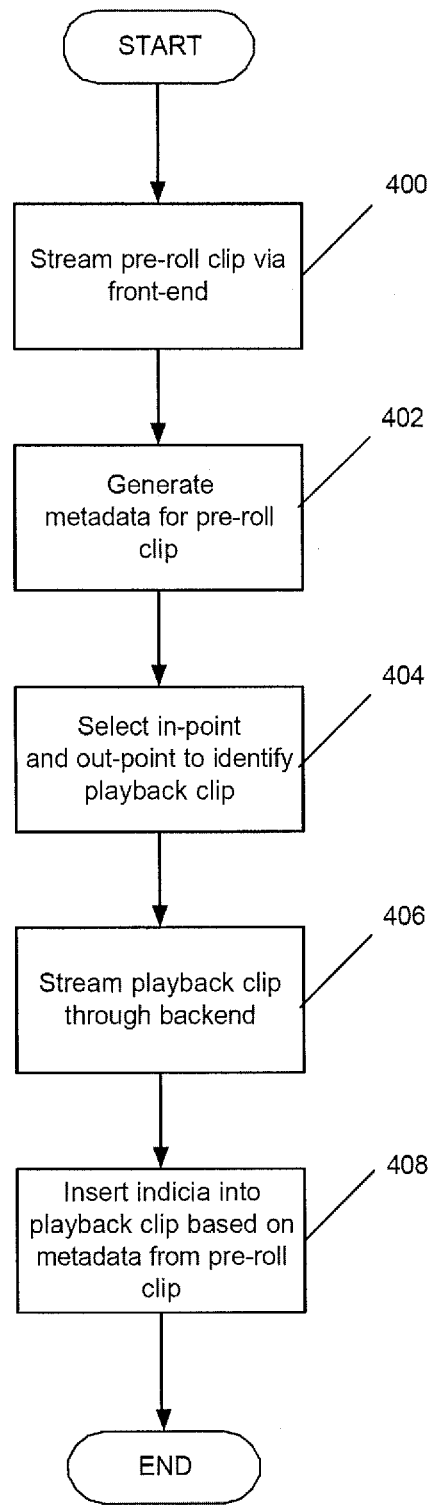
FIG. 4 shows an exemplary flow diagram illustrating the operation of the exemplary insertion system A of FIG. 3A.

FIG. 4 shows an exemplary flow diagram illustrating the operation of the insertion system A (70) in connection with the insertion of indicia into a playback clip. When a director wishes to cut into the broadcast program a highlight clip, the director instructs, in step 400, the operator of the recording and clipping system 60 to stream out to the production switcher 50, via front-end 72, a pre-roll clip, comprising a portion of the feed from the relevant camera that contains the play of interest. The pre-roll clip that is forwarded to the production switcher 50 contains the play of interest plus a certain amount of video "slack" consisting of video preceding the play of interest. This portion of the feed preceding the play of interest is referred to herein as a pre-roll segment. Thus, the overall pre-roll clip 300 will contain the desired highlight clip—the playback clip—plus a portion of video feed preceding the desired highlight clip—the pre-roll segment. In a first iteration, the pre-roll clip is provided to the production switcher 50 via the front-end 72 of the insertion system A (70), and, in a second iteration, the playback clip is provided to the production switcher 50 via the back-end 74 of the insertion system A (70).

As explained above, the front-end of an insertion system performs the scene recognition and tracking functions of the insertion process. These functions involve the generation of certain metadata pertaining to the respective camera's parameters associated with each video frame. For instance, the front-end 72 in step 402 may generate a camera model associated with a frame of the video signal being supplied thereto. The camera model may be, for example, a transform model (capable of mapping a 3D point from the scene to its projection in the video frame) that incorporates extrinsic camera information such as the pan, tilt, roll, zoom, and intrinsic camera information such as focal length, optic axis offset, and other characteristics unique to the camera that supplied the video being analyzed by the front-end 72. These metadata, associated with each frame of the pre-roll clip, is stored in memory for future reference. An exemplary method for storing metadata for future indicia insertion is described in U.S. application Ser. No. 12/424,056 by Kennedy, which is expressly incorporated herein, in its entirety.

In step 404, the director previews the pre-roll clip at the production switcher 50, at which point the director designates the in-point 302 and out-point 304 of the highlight clip or playback clip. At this point, step 406, the operator of the recording and clipping unit 60 streams the playback clip through the back-end 74, this time starting at the in-point 302, and, at the option of the director, in slow motion, possibly pausing at some points to highlight to the viewers certain performance aspects. During this second streaming of the playback clip, this time via the back-end 74, the indicia is being inserted into each frame of the playback clip using the corresponding camera model (metadata) stored in the memory (step 408). Hence, the back-end 74 performs on the playback clip occlusion mask processing and indicia rendering, thereby producing an enhanced playback clip with inserted graphics including advertising or game-relevant markings such as a first down line in a football game. The enhanced playback clip is provided to the director, who cuts it into the program that is broadcast to the viewers.

It is noted that only the metadata corresponding to the playback clip are being used when passing the playback clip via the back-end 74, although the metadata for the whole pre-roll clip (pre-roll segment and playback segment) were calculated when first passing the pre-roll clip via the front-end 72. The reason for this is that many times the playback clip contains a zoomed-in coverage of the highlight play. Thus, starting recognition from the already zoomed-in point may be impossible due to the lack of recognizable features. Therefore, this exemplary embodiment proposes to start the recognition process (in the front-end) from a point in the video where the coverage is zoomed-out (beginning of the pre-roll segment) and to follow with the insertion (in the back-end) only for the desired playback clip. This two-iteration procedure complies with the director's workflow where two passes through recorded clips take place: first, to facilitate the director's preview (first iteration), and, second, to cut into the program (second iteration).

Figure 5:
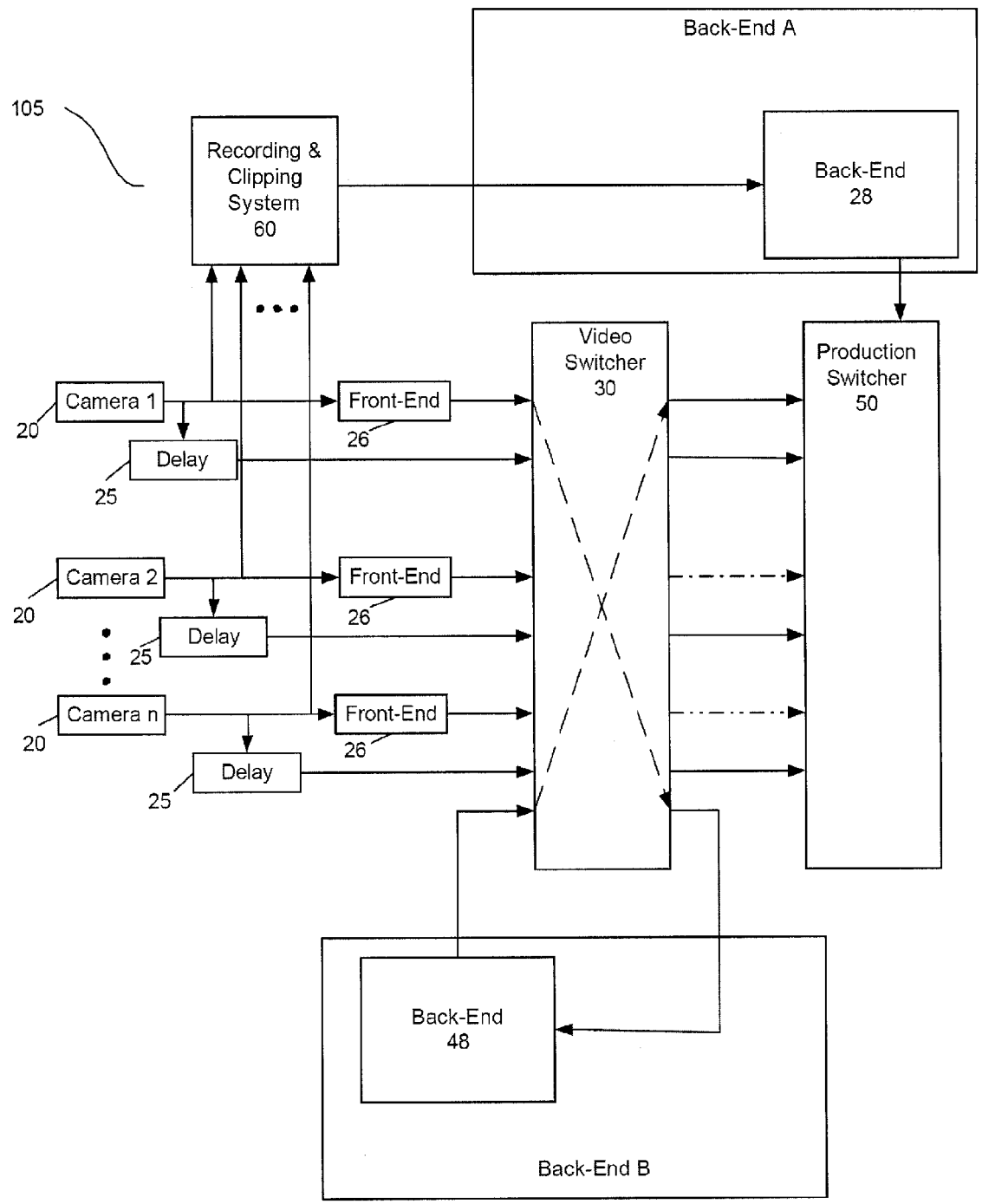
FIG. 5 shows an alternative implementation of the system of FIG. 3A for inserting indicia in highlight clips.

FIG. 5 shows an exemplary alternative system 105 for inserting indicia into highlight clips. Unlike the system 100 of FIG. 3A, in which the front-end 72 processing is employed on a recorded video (pre-roll clip) streamed from the recording and clipping system 60, in system 105 each camera's 20 feed is supplied with a dedicated front-end 26, where metadata (e.g. camera model) is continuously calculated for each camera. Hence, in this system 105 architecture, when a director requests a playback clip of a particular play, the playback clip is streamed once, via the back-end 28 unit, where it is being enhanced based on pre-calculated metadata provided by the respective front-end 26. Hence, while in the system 100 the recorded highlight clip was streamed twice (once as pre-roll clip via the front-end and second as playback clip via the back-end), in the system 105 the recorded clip is streamed once via the back-end 28. Thus, the system 105 may be useful for those situations when a preview of a pre-roll clip by the director may not be necessary during production. Instead, playback clips are created by the recording and clipping system's 60 operator based on pre-defined rules specified by producers and directors.

The operational simplicity gained by the system 105 is at the price of having multiple front-end systems 26, one per a camera feed. Note that although FIG. 5 illustrates two separate back-end units, A and B, it is to be understood that both back-end units can be combined into a single back-end unit, while preserving the ability to perform all the insertion functions described above. Moreover, while not illustrated in FIG. 5, the back-ends 28 and 48 each have access to the metadata generated by the front-end 26 of each camera feed. For example, for each processed frame, the back-end A 28 has access to the corresponding camera model data (e.g. indexed by frame number, CRC, or time code).

In the above-described exemplary embodiments, it was described that multiple feeds from the multiple cameras may be received by the video switcher either in delayed or un-delayed forms and that the un-delayed feed would be processed by the front-end and back-end of the insertion system. However, in modern television recording, the broadcaster may be using three-dimensional (3D) cameras. In 3D cameras, each camera has a stereoscopic video pair (e.g., each camera outputs two feeds, a left eye image and a right eye image). The exemplary embodiments may also be implemented with such 3D camera feeds. In such a case, the delay elements will delay both the left eye image and the right eye image of all the camera feeds, while the left eye image and the right eye image for the selected camera feed for insertion will be fed un-delayed to the video switcher that will feed this stereoscopic video pair captured by the selected 3D camera to the insertion system. In this case, the insertion system (front-end and back-end) performs recognition, tracking, insertion, etc. on both the left eye image and the right eye image, for example, according to the systems and methods described in U.S. patent application Ser. No. 12/879,482 by Katz, filed Oct. 21, 2009, which is expressly incorporated herein, in its entirety.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. The hardware platform may also be a standard video processing platform and its associated hardware and software components. In a further example, the exemplary embodiments of the insertion systems and methods may be a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method, comprising:
 delaying a first version of a video feed from a video camera according to a first delay to generate a second version of the feed;
 supplying the first version to an insertion system, wherein the insertion system inserts an indicia into the first version to create an enhanced version with a second delay substantially matching the first delay; and
 supplying the enhanced version and the second version to a production switcher, wherein the enhanced version and the second version supplied to the production switcher are synchronized with one another.

2. The method according to claim 1, further comprising:
 receiving a plurality of first versions of video feeds from a plurality of video cameras; and
 selecting one of the plurality of first versions to supply to the insertion system to create the enhanced version of the selected one of the first versions.

3. The method according to claim 2, wherein the selecting is based on one of:
 receiving an indication that one of the video cameras is an active camera; and
 receiving an indication from the production switcher.

4. The method according to claim 2, further comprising:
 delaying the first versions of all the video feeds to generate second versions of the feeds; and
 supplying all the second versions to the production switcher synchronized with the enhanced version of the selected one of the first versions.

5. The method according to claim 1, further comprising:
 supplying one of the enhanced version and the second version for insertion into a broadcast program.

6. The method according to claim 1, wherein the video feed is a stereoscopic video pair including a left eye image and a right eye image.

7. A system, comprising:
 a video delay element receiving a first version of a feed from a video camera and delaying the first version according to a first delay to generate a second version of the feed; and
 a video switcher receiving the first version and supplying the first version to an insertion system, wherein the insertion system inserts an indicia into the first version to create an enhanced version with a second delay substantially matching the first delay, the video switcher further receiving the second version from the video delay element and outputting the enhanced version and the second version to a production switcher, the output to the production switcher of the enhanced version and the second version are synchronized with one another.

8. The system according to claim 7, wherein the video switcher receives first versions of feeds from a plurality of video cameras and supplies a selected one of the first versions to the insertion system.

9. The system according to claim 8, wherein the selected one of the first versions is based on one of an input received by the video switcher from the production switcher and an input received by the video switcher indicating that one of the video cameras is an active camera.

10. The system according to claim 8, further comprising:
 further video delay elements corresponding to each of the plurality of video cameras, each further video delay element delaying the first version of the video feed of the corresponding video camera to generate a second version of the corresponding feeds, the video switcher receiving all the second versions and outputting all the second versions to the production switcher synchronized with the enhanced version of the selected one of the first versions.

11. The system according to claim 7, wherein the production switcher outputs one of the enhanced version and the second version for insertion into a broadcast program.

12. The system according to claim 8, further comprising:
 a recording and clipping system receiving the first versions from each of the video cameras and outputting a pre-roll clip from one of the first versions to a front-end of the insertion system to generate metadata pertaining to the pre-roll clip, the recording and clipping system further receiving an identification of a playback clip within the pre-roll clip and outputting the playback clip to a back-end of the insertion system to insert an indicia into the playback clip based on the metadata, the playback clip including the indicia being output by the insertion system to the production switcher.

13. The system according to claim 12, wherein a pre-roll segment, within the pre-roll clip and preceding the play-back clip, includes characteristic image features sufficient to enable metadata extraction.

14. The system according to claim 8, further comprising:
 a recording and clipping system receiving the first versions from each of the video cameras, wherein a front-end of the insertion system generates metadata for each of the first versions of the feeds, the recording and clipping system receiving an identification of a playback clip within one of the first versions and outputting the playback clip to a back-end of the insertion system to insert an indicia into the playback clip based on the metadata generated for the first version of the feed which includes the playback clip, the playback clip including the indicia being output by the insertion system to the production switcher.

15. The system according to claim 7, wherein an amount of the first delay is based on one of a type of event of the feed and a video format of the feed.

* * * * *